US012147985B1

(12) United States Patent
Vengalathur Srinath

(10) Patent No.: US 12,147,985 B1
(45) Date of Patent: Nov. 19, 2024

(54) FUND TRANSFER MANAGEMENT

(71) Applicant: Wells Fargo Bank, N.A., San Francisco, CA (US)

(72) Inventor: Badrinath Vengalathur Srinath, Fremont, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 51 days.

(21) Appl. No.: 17/930,528

(22) Filed: Sep. 8, 2022

(51) Int. Cl.
*G06Q 20/10* (2012.01)
*G06Q 20/40* (2012.01)

(52) U.S. Cl.
CPC ....... *G06Q 20/4016* (2013.01); *G06Q 20/102* (2013.01)

(58) Field of Classification Search
None
See application file for complete search history.

(56) References Cited

U.S. PATENT DOCUMENTS

| 6,850,923 | B1* | 2/2005 | Nakisa | G06N 5/025 |
| | | | | 706/45 |
| 7,373,324 | B1* | 5/2008 | Engin | G06Q 40/00 |
| | | | | 705/37 |
| 11,068,901 | B2 | 7/2021 | Henry et al. | |
| 11,176,544 | B2 | 11/2021 | Dunwoody | |
| 2005/0154662 | A1* | 7/2005 | Langenwalter | G06Q 40/00 |
| | | | | 705/37 |
| 2008/0210751 | A1 | 9/2008 | Kim | |
| 2014/0289120 | A1 | 9/2014 | Fulton et al. | |
| 2017/0011379 | A1 | 1/2017 | Kouru et al. | |
| 2018/0165554 | A1* | 6/2018 | Zhang | G06F 18/2411 |
| 2020/0279235 | A1 | 9/2020 | Booth et al. | |

(Continued)

FOREIGN PATENT DOCUMENTS

WO 2008011102 1/2008

OTHER PUBLICATIONS

Adedoyin, Adeyinka, "Predicting Fraud in Mobile Money Transfer", A thesis submitted in partial fulfilment of the requirements of the University of Brighton for the degree of Doctor of Philosophy, (Jun. 2018), 203 pgs.

(Continued)

*Primary Examiner* — William J Jacob
(74) *Attorney, Agent, or Firm* — SCHWEGMAN LUNDBERG & WOESSNER, P.A.

(57) ABSTRACT

Various examples are directed to systems and methods for facilitating fund transfers. A fund transfer system may access first training data comprising a first plurality of fund transfer records and train a computerized model, using the first training data, to generate a trained computerized model. The fund transfer system may use the computerized model to execute a plurality of fund transfer requests using the trained computerized model. The fund transfer system may access second training data comprising a second plurality of fund transfer records describing fund transfers executed in response to the plurality of fund transfer requests and re-train the computerized model using the second training data to generate a re-trained computerized model. The fund transfer system may execute an additional plurality of fund transfer requests using the re-trained computerized model.

20 Claims, 11 Drawing Sheets

(56) References Cited

U.S. PATENT DOCUMENTS

2020/0410596 A1\* 12/2020 Ridlington ............. G06Q 40/06
2021/0019728 A1    1/2021 Collinge et al.
2022/0067694 A1    3/2022 Solov'ev et al.

OTHER PUBLICATIONS

Soni, Vishal Dineshkumar, "Role of Artificial Intelligence in Combating Cyber Threats in Banking", International Engineering Journal For Research and Development, 4(1), 7, (Jan. 2019), 8 pgs.

\* cited by examiner

FUND TRANSFER MANAGEMENT

BACKGROUND

There are many different mechanisms for moving funds from one account to another. These include traditional techniques such as wire transfers and lockbox transfers, newer techniques such as Automated Clearing House (ACH) transfers and online transfer services, such as the Zelle® service, Pay Pal® services and similar services. Different fund transfer mechanisms provide different options to users in terms of speed, risk, compliance with reporting requirements, and the like.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Figure 1:
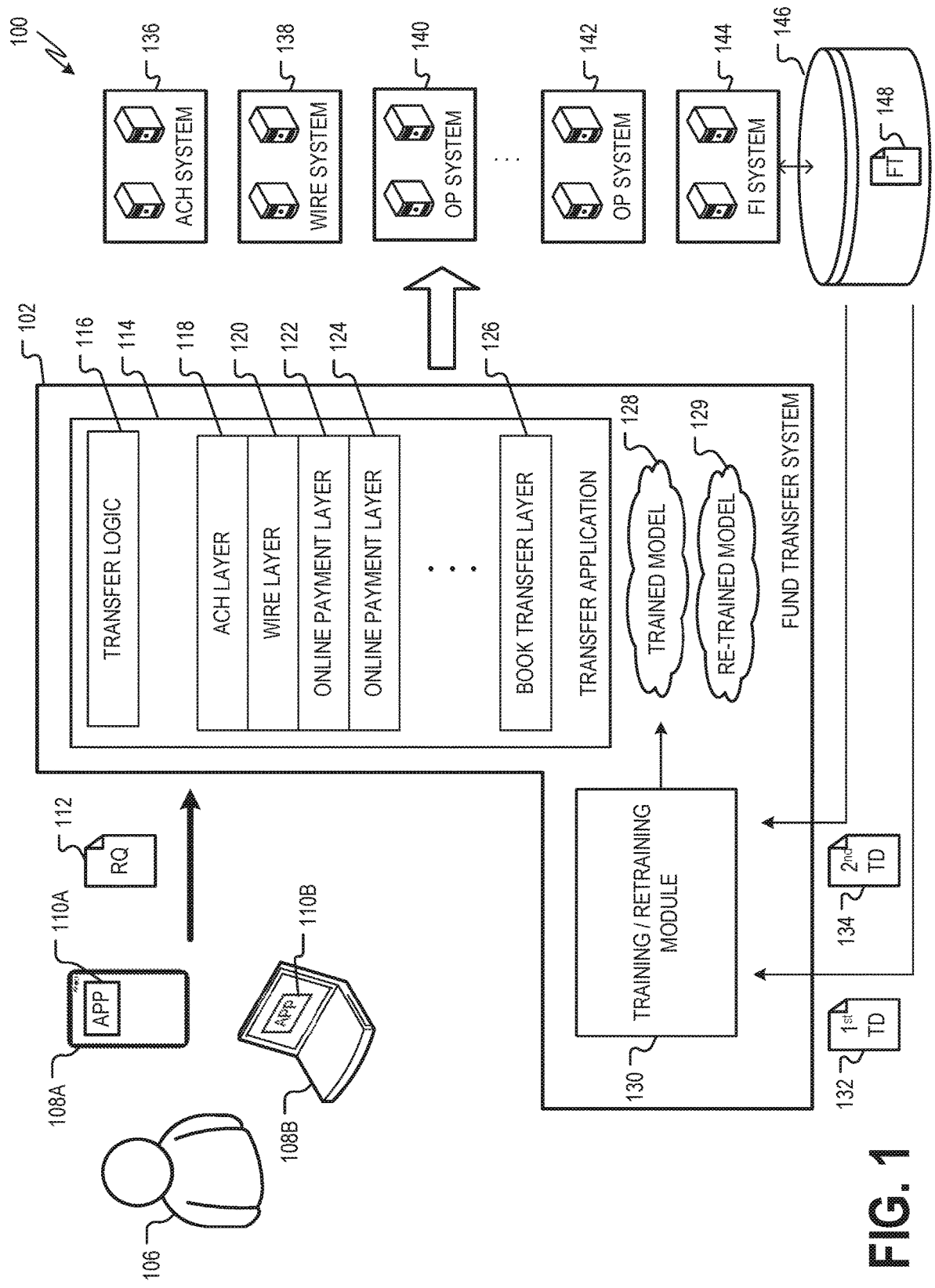
FIG. 1 is a diagram showing one example of an environment for servicing fund transfer requests.

The availability of large numbers of fund transfer mechanism options can present challenges to consumers of financial services. Different fund transfer mechanisms have different properties affecting sending users, receiving users, and financial institutions in different ways. For example, different fund transfer mechanisms have different costs, including different costs to the sending user and different costs to the receiving user. Different fund transfer mechanisms also have different speeds. For example, a wire transfer may take about twenty-four hours to complete from the time that a fund transfer is requested to the time that funds are deposited to the receiving user's account. On the other hand, some online fund transfer mechanisms operate very quickly, in a matter of seconds or minutes. Different fund transfer mechanisms may also support different types of accounts for the sending party, different levels of insurance, and different levels of support for transaction reporting.

Different fund transfer mechanisms have traditionally been supported by disparate software applications. For example, a user who wishes to request a fund transfer using 3-day ACH may access an application specific to ACH or even particular to 3-day ACH. A user wishing to request a fund transfer using an online fund transfer mechanism may access a different application that is specific to that online fund transfer mechanism. The result is an often-bewildering array of applications and application features available to financial institution customers.

The large number of different fund transfer applications can make it challenging for financial institution customers to select the appropriate fund transfer application for each requested fund transfer. As a result, many financial institution customers tend to repeatedly re-use the same fund transfer mechanism, even though the selected mechanism may not be most suitable for all of the customer's transactions. This can lead to sub-optimal results in terms of timing, risk, reporting, and other factors.

These and other problems may be addressed with systems and methods that use a trained computerized model to select or aid in the selection of a fund transfer mechanism for a requested fund transfer. Instead of repeatedly using the same fund transfer mechanism, for example, this may allow a financial institution customer to select the most appropriate fund transfer mechanism for each requested fund transfer based on the parameters of the requested fund transfer.

A trained computerized model may be executed at a computing device or devices. The trained computerized model may receive values for a set of fund transfer parameters describing a requested fund transfer. The set of fund transfer parameters may include, for example, counterparty data describing the requested counterparty, amount data describing an amount of the transfer, sender and recipient account data describing a sender account and a recipient account for the fund transfer, reporting data describing one or more reporting requirements or preferences for the transaction, and/or the like. From the set of fund transfer parameters, the trained computerized model may generate an indication of one or more fund transfer mechanisms that may be used for the requested fund transfer. The requested fund transfer may be executed based on the fund transfer mechanism or mechanism determined by the trained computerized model.

Using a trained computerized model to select a fund transfer mechanism may provide benefits to financial institution customers and to financial institutions themselves. For example, financial institution customers, including sending users and receiving users, may enjoy reduced transaction fees, better risk management, more appropriate transaction reporting and the like. Financial institutions may also enjoy various benefits including, a reduction in expenses to cover fraudulent or mis-directed fund transfers. For example, if a fund transfer is sent to a mistaken or fraudulent recipient and the funds cannot be recovered, oftentimes the sender's financial institution will reimburse the customer/sender for all or part of the loss. Selecting fund transfer mechanisms with appropriate risk management may reduce or eliminate the need for the financial institution to bear this expense.

In some examples, however, a financial institution that desires to implement a trained computerized model to aid in the selection of fund transfer mechanisms may have difficulties obtaining suitable training data. Training data for a computerized model is labeled to indicate the desired results for the model. Training data for a fund transfer mechanism model, then, may include various records where each record comprises values for the set of fund transfer parameters as well as one or more suitable fund transfer mechanisms associated with the values. The computerized model is then trained to return the one or more suitable fund transfer mechanisms in response to receiving the corresponding values for the set of fund transfer parameters, or similar values.

A financial institution may possess records of completed fund transfers that indicate the fund transfer mechanism actually used for the completed fund transfers. As described herein, however, the fund transfer mechanism actually used for a completed fund transfer may not be the best or most optimized fund transfer mechanism for that transaction. Accordingly, the fund transfer records held by the financial institution may not be optimized or, in some examples, even suitable for training an accurate computerized model.

Various examples described herein address this and other issues by utilizing a multi-stage training technique for the trained computerized model. For example, a computerized model may be initially trained using first training data. The first training data may be labeled using feedback data available for completed fund transfers. The feedback data a completed fund transfer may include, for example, the presence or absence of a customer complaint, the presence or absence of a fraud claim on the completed fund transfer, a user-indicated satisfaction level for the completed fund transfer, and/or the like. The feedback data may be used to label completed fund transfers as successful or unsuccessful. For example, a completed fund transfer that is not associated with customer complaint data and is not associated with a fraud claim may be considered a successful fund transfer. Also, for example, a fund transfer having a user satisfaction level greater than a threshold value may be considered a successful fund transfer.

The first training data, labeled with feedback data, may be used to train a computerized model. The trained computerized model is then used to execute additional fund transfer requests. For example, the trained computerized model may be used to generate a plurality of candidate fund transfer mechanisms for a considered fund transfer request. The candidate fund transfer mechanisms may be provided to the requesting user, for example, along with information describing the properties of the candidate fund transfer mechanisms. The user may then select a fund transfer mechanism for the fund transfer from the candidate fund transfer mechanisms.

Results generated from the additional fund transfer requests may be used to generate second training data. The second training data may be labeled based on the fund transfer mechanisms selected by the users with respect to the additional fund transfer requests. The second training data may be used to re-train the computerized model. The re-trained computerized model may then be used to execute incoming fund transfer requests.

FIG. 1 is a diagram showing one example of an environment 100 for servicing fund transfer requests. The environment 100 comprises a fund transfer system 102, user computing devices 108A, 108B, various fund transfer mechanism systems 136, 138, 140, 142, and a financial institution system 144.

In the example of FIG. 1, the fund transfer system 102 executes a transfer application 114 that receives and executes fund transfer requests from users, such as the fund transfer request 112 received from the user 106 via user computing devices 108A, 108B. The fund transfer system 102 may comprise one or more computing devices, such as servers and/or the like, and may be located at a single geographic location and/or distributed across multiple geographic locations.

FIG. 1 shows an example user 106 who makes a fund transfer request directed to the transfer application 114. The user 106 may be a sending user or a receiving user. A sending user is a user who requests a transfer of funds from an account of the sending user to an account of a receiving user. A receiving user is a user who requests a transfer of funds from an account of a sending user to an account of the receiving user.

The user 106 may make the fund transfer request 112 using a user computing device 108A, 108B. The user computing devices 108A, 108B may be any suitable computing device or devices such as, for example, a smart phone, a tablet computer, a laptop computer, a smart watch, and the like. User computing devices 108A, 108B may comprise input/output (I/O) devices for providing the UI to a user 106. For example, user computing devices 108A, 108B may comprise a display for showing a user interface (UI) to the user 106. Two user computing devices 108A, 108B are shown in FIG. 1, although it will be appreciated that the user 106 may use a single user computing device 108A, 108B to make a fund transfer request 112 and/or may use one user computing device 108A, 108B at a time.

The user computing devices 108A, 108B may execute an application 110A, 110B that facilitates the requesting and execution of fund transfers. The application 110A, 110B, in some examples, facilitates communication with the transfer application 114 executing at the fund transfer system 102. In other examples, the application 110A, 110B performs the functionality of the transfer application 114. For example, the application 110A, 110B may process a fund transfer request 112 from the user 106 and communicate with various fund transfer mechanism systems 138, 138, 140, 142 and/or a financial institution system 144 to execute a fund transfer, as described herein. In this example, the functionality of the transfer application 114 described herein may be performed by the application 110A, 110B.

In some examples, the application 110A, 110B is a web browser or similar application that communicates with the fund transfer system 102 to access the transfer application 114 as a web application. For example, the fund transfer system 102 (e.g., the transfer application 114) may serve a UI to the user computing devices 108A, 108B, where the UI is for the user 106 to input the fund transfer request 112. Also, in some examples, the application 110A, 110B is an application that otherwise communicates with the fund transfer system 102. For example, the application 110A, 110B may be or include a mobile or other application that includes an embedded web view or other view that receives a web document from the fund transfer system 102 (e.g., the transfer application 114).

The transfer application 114 may comprise transfer logic 116 and various layers 118, 120, 122, 124, 126. The transfer logic 116 may comprise code that is executable (e.g., at the fund transfer system 102 and/or the user computing device 108A, 108B) to receive and execute fund transfer requests 112, as described herein. The various layers 118, 120, 122, 124, 126 may correspond to different fund transfer mechanisms. Different layers 118, 120, 122, 124, 126 may be in communication with various fund transfer mechanism systems 136, 138, 140, 142 to execute fund transfers, for example, as instructed according to the transfer logic 116.

An ACH layer 118 of the transfer application 114 may be in communication with an ACH system 136. The ACH system 136 may include one or more computing devices and/or systems that are configured to execute ACH transactions. The ACH system 136 may be or include a network configured to execute fund transfers, for example, between accounts held by different financial institutions. In some examples, the ACH system 136 is configured to execute fund transfers according to different mechanisms. For example, some ACH systems 136 are configured to execute standard or 3-day ACH transfers that may take as long as three days from the day of the request to deposit funds in a recipient account. In some examples, the ACH systems 136 are configured to execute expedited ACH fund transfers such as, for example, 1-day ACH transfers. In some examples, different types of ACH fund transfers are handled by different ACH systems.

A wire layer 120 of the transfer application 114 may be in communication with a wire system 138. The wire system 138 may be configured to execute fund transfers using a wire transfer mechanism. For example, the wire system 138 may receive an indication that the requestor of the fund transfer has deposited the amount of the transfer with a first financial institution. The wire system 138 may send a request to credit a recipient account, for example, at a different financial institution, with the amount of the transfer, for example, as well as instructions for settling the amount between the first financial institution and the second institution. The time between the initiation of a wire transfer and the time when the transferred amount is available in the recipient account at the second financial institution may be, for example, several hours to several days.

Online payment layers 122, 124 may be in communication with one or more online payment systems 140, 142. Online payment systems 140, 142 may be executed by various financial institutions who offer online payment services such as, for example, Zelle® service, PayPal® services and similar services. The respective online payment layers 122, 124 may transmit appropriate fund transfer requests to the appropriate online payment systems 140, 142 to execute the requested fund transfers.

A book transfer layer 126 is in communication with a financial institution system 144 to facilitate fund transfers according to a book transfer mechanism. A book transfer is when a single account holder requests a fund transfer from one account held by another account. In this way, for example, a fund transfer request 112 for a book transfer may have a single user who is both the sending user and the receiving user. Book transfer requests may be handled directly by the financial institution system 144 at which the accounts are held.

The various layers 118, 120, 122, 124, 126, fund transfer mechanism systems 136, 138, 140, 142, and financial institution system 144 are provided as examples. It will be appreciated that the transfer application 114 may have more or fewer layers than what is shown to provide fund transfers according to more or fewer fund transfer mechanisms that is shown.

FIG. 1 also shows an example training/retraining module 130 executing at the fund transfer system 102. The training/retraining module 130 may be for training a trained computerized model 128 and a re-trained computerized model 129 that are used by the transfer application 114 to select one or more candidate fund transfer mechanisms for executing a fund transfer request as described herein. The training/retraining module 130 may comprise code that is executable (e.g., at the fund transfer system 102 and/or the user computing device 108A, 108B) to train and/or retrain the trained model 128.

The training/retraining module 130 may receive first training data 132 from the financial institution system 144. For example, the financial institution system 144 may comprise a data store 146 comprising fund transfer data 148. Fund transfer data 148 may comprise records describing previously executed fund transfers involving customers of the corresponding financial institution. For example, fund transfer data 148 may describe executed fund transfers requested by customers of the financial institution. In some examples, fund transfer data 148 may also describe previously executed fund transfers that were requested by customers of other financial institutions but include a customer of the financial institution, for example, as a sending user and/or as a receiving user.

Fund transfer data 148 may include various records, with each record corresponding to an executed fund transfer. The record for an executed fund transfer may include values for a set of fund transfer parameters describing the executed fund transfer. The fund transfer parameters may include, for example, requesting user data identifying the requesting user. The fund transfer parameters may also include counterparty data describing the counterparty. As described herein, the requesting user may be the sending user or the receiving user. Similarly, the counterparty may be the sending user or the receiving user depending on the context. Counterparty data may include additional information about the counterparty including, for example, counterparty account data describing the financial account of the counterparty used for the fund transfer, address data describing an address of the counterparty, and/or other relevant information. The record for an executed fund transfer, in some examples, also includes, in some examples, an indication of the fund transfer mechanism used to execute the fund transfer. In examples in which the requesting user selected a fund transfer mechanism, this may also be indicated in the fund transfer record. Other example fund transfer parameters include a date of the fund transfer, a time of day of the fund transfer, and/or the like.

The record for an executed fund transfer at the fund transfer data 148 may also include feedback data describing feedback received on the executed fund transfer (if any). In some examples, feedback data may indicate whether the executed fund transfer was successfully completed. In other examples, feedback data may describe any complaints received form the requesting user. For example, if a fund transfer took longer to complete than the requesting user anticipated, this may be indicated by feedback data. If there was a fraud claim on the executed fund transfer, this may also be indicated by the feedback data. A fraud claim may be made, for example, if the receiving party for the fund transfer was misidentified or if a fund transfer was otherwise directed to an incorrect receiving party.

The first training data 132 may be generated using the fund transfer data 148, including the feedback data. The feedback data may be used to label the executed fund transfers described by the fund transfer data 148. In some examples, a completed fund transfer may be labeled as successful if it is not the subject of any negative feedback (e.g., fraud claims, user complaints, and/or the like). If the fund transfer is the subject of negative feedback, it may be labeled as unsuccessful.

The training/retraining module 130 may use the first training data 132 to train the trained model 128. Recall that the first training data 132 comprises records of completed fund transfers that are described by values for the set of fund transfer parameters and are labeled as successful or unsuccessful. The trained computerized model 128 may be trained to associate values for the set of fund transfer parameters, including the fund transfer mechanism, with successful fund transfers and/or with unsuccessful fund transfers, for example, based on the first training data.

The trained computerized model 128 may be arranged according to any suitable model format that can associated sets of fund transfer parameters with success and/or lack of success. In some examples, the trained computerized model 128 is a classification model, however, that the systems and methods described herein may be generally applicable for use with other computerized models, such as supervised learning models. Supervised learning models, such as classification models and regression models, model independent variables (e.g., fund transfer parameter values) and a dependent variable (e.g., success or failure of the fund transfer).

Classification models and regression models are both examples of supervised learning models. Supervised learning models train a computerized model on independent variables (e.g., fund transfer parameter values) and dependent variables (e.g., success or failure of the fund transfer). Classification models may be useful in situations where the dependent variable is binary or may take only a range of discrete values. For example, when the trained computerized model 128 is a classification model, the result of the model 128 may include a binary (e.g., likely success or likely failure). Regression models, on the other hand utilize a dependent variable that is continuous. For example, when a regression model is used, instead of indicating that values for the set of fund transfer parameters are likely to succeed or fail, the regression model may return raw scores for a set of fund transfer parameter values, with the raw scores indicating the percentages probability that a fund transfer with the corresponding set of fund transfer parameter values would be successful.

Some machine learning models have both classification and regression implementations. For example, the K-Nearest Neighbors model may be implemented as either a classification model or a regression model. Other models may be more suitable for one implementation or the other. For example, the Ordinary Least Squares model may be most suitable for a regression implementation. Also, the Logistic Regression model may be most suitable for a classification implementation.

The examples herein are described for use with classification models. In various examples, however, in some examples, it may be useful or desirable to utilize a set of regression models in place of the set of classification models. Accordingly, the systems and methods described herein may also be implemented utilizing a set of classification models, a set of regression models, a mixed set of supervised learning models including classification models and regression models, etc.

When the transfer application 114 receives a fund transfer request 112, the fund transfer request 112 may include values for the set of fund transfer parameters. In some examples, not all of the values for the set of fund transfer parameters are included with the fund transfer request 112. The transfer application 114 may query other sources to obtain values for values for the set of fund transfer parameters that may not be included with the fund transfer request 112. This may include, for example, querying the user 106 and/or communicating with an additional source such as, for example, the financial institution system 144.

The transfer application 114 may use the values of the set of fund transfer parameters to call the trained computerized model 128. In response, the trained computerized model 128 may generate one or more candidate fund transfer mechanisms for the fund transfer request 112. The candidate fund transfer mechanisms may include, for example, fund transfer mechanisms that, in combination with the other values for the set of fund transfer parameters, are determined by the computerized model 128 to be likely to result in a successful fund transfer.

In some examples, the trained computerized model 128 also generates the risk score to correspond with the set of fund transfer parameter values describing a requested fund transfer. In some examples, the trained computerized model 128 generates a risk score associated with each of the candidate fund transfer mechanisms. The risk score, in some examples, indicates a likelihood that the requested fund transfer is fraudulent or otherwise directed to an incorrect receiving user with a particular candidate fund transfer mechanism. The transfer application 114 may use the risk score, as described herein, to reduce the risk of executing a fraudulent or incorrect transaction. In examples in which the trained computerized model 128 has a continuous dependent variable, the risk score may be based on the output of the computerized model 128 and may indicate the likelihood that the requested fund transfer will be unsuccessful with a particular fund transfer mechanism.

The transfer application 114, in some examples, provides the set of candidate fund transfer mechanisms the user 106, for example, via the application 110A, 110B and user computing device 108A, 108B. Along with the identity of the candidate fund transfer mechanisms, the transfer application 114 may also provide data describing the candidate fund transfer mechanisms including, for example, an estimated time to complete the fund transfer using the fund transfer mechanism, reporting capabilities of the financial institution with respect to the fund transfer mechanism, a cost of the fund transfer to the sending user using the fund transfer mechanism, a cost of the fund transfer to the receiving user using the fund transfer mechanism, any fraud insurance options that may be included and/or available with the fund transfer mechanism, and/or the like. The user 106 may select a fund transfer mechanism from the candidate fund transfer mechanism and the transfer application 114 may initiate execution of the requested fund transfer, for example, by calling the appropriate layer 118, 120, 122, 124, 126.

The transfer application 114 (or other suitable component) may cause a record of each completed fund transfer to be provided to the financial institution system 144 for storage at the data store 146. Records describing fund transfers executed using the trained computerized model may include an indication of the fund transfer mechanism selected by the user 106 based on the description provided to the user.

After a number of fund transfer requests have been executed using the trained computerized model 128, the training/retraining module 130 may receive second training data 134. The second training data 134 may describe some or all of the fund transfers executed using the trained computerized model 128. Records describing the fund transfers executed using the trained computerized model 128 may indicate the fund transfer mechanism selected by the user 106. In this way, these records describing the fund transfers executed using the trained computerized model 128 may be labeled with the fund transfer mechanism selected by the respective users based on the candidate fund transfer mechanisms selected by the trained computerized model 128.

Labeled records of fund transfers executed using the trained computerized model 128 may make up some or all of the second training data 134. The training/retraining module 130 may use the second training data to re-train the trained computerized model 128 to generate a re-trained computerized model 129. The re-trained computerized model 129 may be of the same type as the trained computerized model 128 or, in some examples, may be a different kind of computerized model. Also, the second training data 134, in some examples, includes only records describing fund transfers executed using the trained computerized model 128 or may also include records from the first training data 132.

The re-trained computerized model 129 may be used to execute subsequent fund transfer requests. In some examples, the re-trained computerized model 129 may be more accurate than the trained computerized model 128, for example, due to improved quality of the second training data 134. For example, instead of simply indicating whether an executed fund transfer was successful or unsuccessful, the second training data may include an indication of a fund transfer mechanism that was selected for the corresponding set of fund transfer parameter values based on the trained computerized model 128 and input from the user 106.

Figure 2:
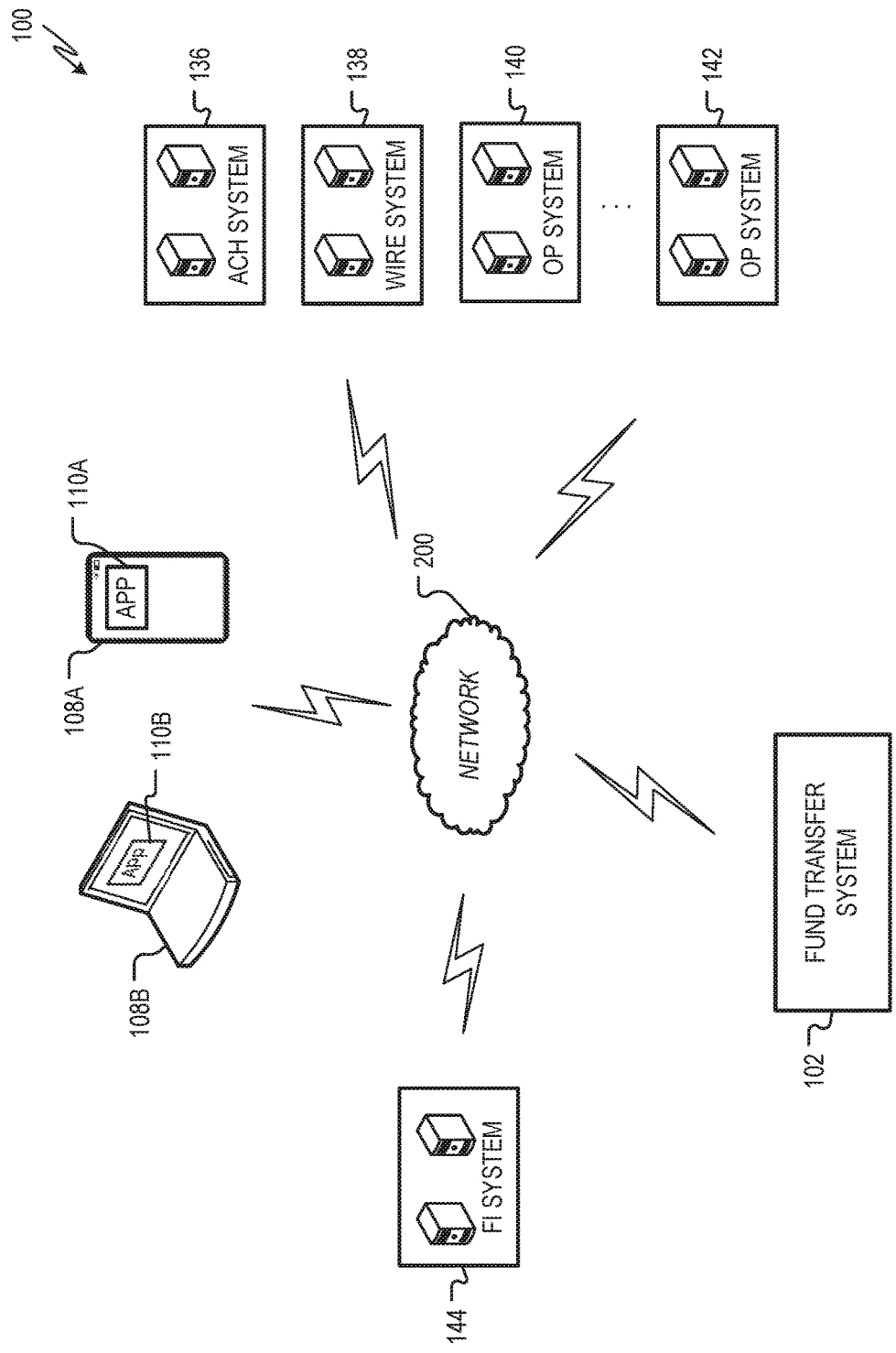
FIG. 2 is a diagram showing another example of the environment including additional details.

FIG. 2 is a diagram showing another example of the environment 100 including additional details. In the example of FIG. 2, the fund transfer system 102, user computing devices 108A, 108B, financial institution system 144 and fund transfer mechanism systems 136, 138, 140, 142 are in communication with one another via a network 200. The network 200 may be or comprise any suitable network element operated according to any suitable network protocol. For example, one or more portions of the network 200 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, a combination of two or more such networks, and so forth.

Figure 3:
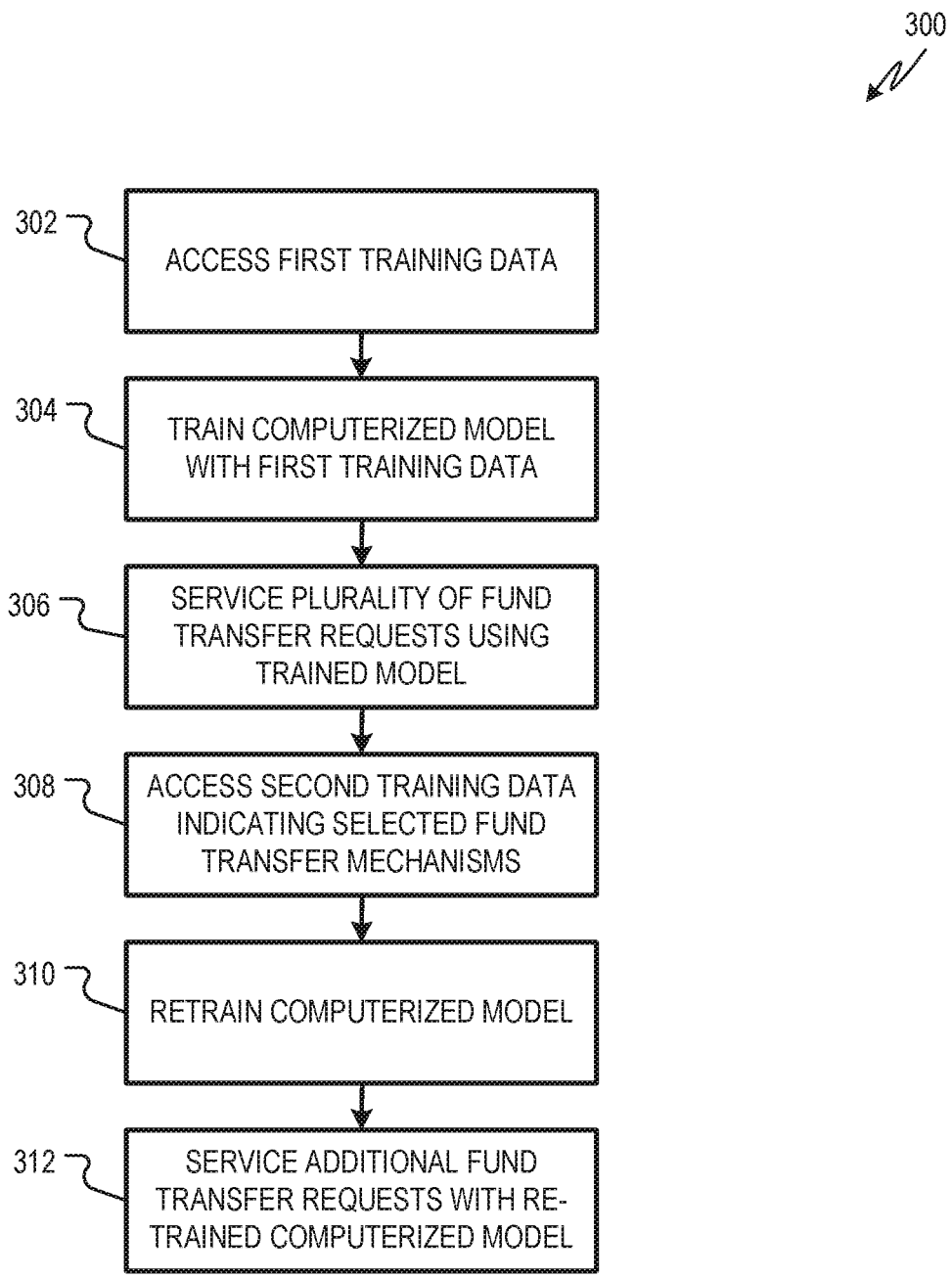
FIG. 3 is a flowchart showing one example of a process flow that may be executed in the environment of FIG. 1 to execute fund transfer requests.

FIG. 3 is a flowchart showing one example of a process flow 300 that may be executed in the environment 100 to execute fund transfer requests, such as the fund transfer request 112, using a trained computerized model. At operation 302, the training/retraining module 130 may access first training data 132. As described herein, the first training data 132 may be generated from fund transfer data 148, using feedback data+ to label records of executed fund transfers. At operation 304, the training/retraining module 130 may train a computerized model to generate a trained computerized model 128, as described herein.

At operation 306, the transfer application 114 may execute a plurality of fund transfer requests using the trained computerized model 128. An additional example showing how the transfer application 114 may execute a fund transfer request using the trained computerized model 128 is provided herein with respect to FIG. 4. Each fund transfer request executed by the transfer application 114 using the trained computerized model 128 may be described by a record (for example, at the financial institution system 144). The record, as described herein, may indicate the set of fund transfer parameter values associated with the fund transfer request as well as, for example, the candidate fund transfer mechanism selected by the user.

At operation 308, the training/retraining module 130 accesses the second training data 134. The second training data 134, as described herein, may be partially or wholly comprised of records describing fund transfers executed using the trained computerized model 128 at operation 306. The training/retraining module 130 may re-train the computerized model at operation 310 to generate the re-trained computerized model 129 at operation 310. At operation 312, the transfer application 114 may execute additional fund transfer requests using the re-trained computerized model 129. For example, as described herein, the re-trained computerized model 129 may be used to generate one or more recommended fund transfer mechanisms for use with a requested fund transfer. In some examples, the transfer application 114 may execute fund transfer requests using the re-trained computerized model 129 in the same way that it executed fund transfer requests using the trained computerized model 128. In other examples, the transfer application 114 may exploit the improved accuracy of the re-trained computerized model 129 to modify the way that fund transfer requests are executed. For example, the transfer application 114 may use the re-trained computerized model 129 to select a recommended fund transfer mechanism and may provide the recommended fund transfer mechanism to the user along with other candidate fund transfer mechanisms from which the user may select. In other examples, the transfer application 114 may execute the requested fund transfer using the recommended fund transfer mechanism without querying the user. Examples of how the re-trained computerized model 129 may be used to execute fund transfer requests are provided herein with reference to FIGS. 5 and 6.

Figure 4:
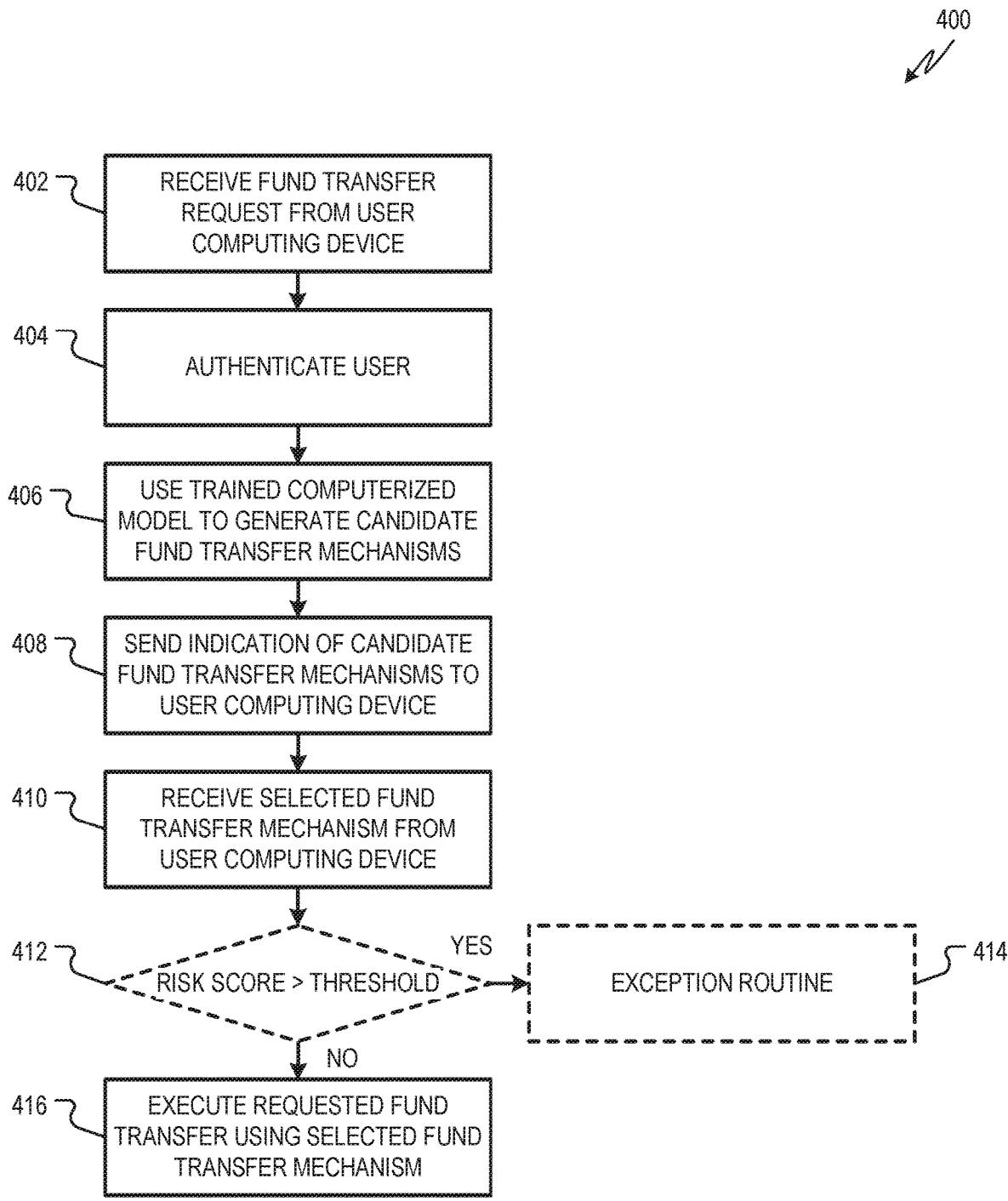
FIG. 4 is a flowchart showing one example of a process flow that may be executed in the environment of FIG. 1 to execute a fund transfer request using a trained computerized model.

FIG. 4 is a flowchart showing one example of a process flow 400 that may be executed by the transfer application 114 to execute a fund transfer request, such as the fund transfer request 112, using the trained computerized model 128. At operation 402, the transfer application 114 receives a fund transfer request from the user via a user computing device. With respect to the received fund transfer request, the user may be a sending user or a receiving user. The received fund transfer request may include values for a set of fund transfer parameters describing the requested fund transfer.

At operation 404, the transfer application 114 authenticates the user. The user may be authenticated in any suitable manner. In some examples, the user provides credential data. The transfer application 114 compares the credential data to reference credential data stored for the user. In other examples, 2-factor authentication can be used. For example, if the user is requesting the fund transfer from one user computing device 108A, the transfer application 114 may send an authentication code to another user computing device 108A associated with the user. The user may return the authentication code via the user computing device 108B.

At operation 406, the transfer application 114 uses the trained computing model 128 to generate a set of candidate fund transfer mechanisms for the requested fund transfer. The set of candidate fund transfer mechanisms may include, for example, all fund transfer mechanisms for which the trained computerized model 128 predicts that the fund transfer indicated by the received fund transfer request will be successful. In some examples, such as when the trained computerized model has a dependent variable that is continuous, the candidate fund transfer mechanisms may include the fund transfer mechanisms that have the highest probability of success. For example, the transfer application 114 may select the fund transfer mechanisms having a likelihood of success greater than a threshold value. In other examples, the transfer application 114 may select a predetermined number of fund transfer mechanisms having the highest likelihood of success, the lowest risk score, or some combination the two.

At operation 408, the transfer application 114 may send to the user (e.g., via the user computing device 108A, 108B), an indication of the candidate fund transfer mechanisms determined at operation 406. This may include, for example, providing the user with descriptions of the candidate fund transfer mechanisms such as, for example, times to complete the transfers, costs to the sending user, costs to the receiving user, available insurance options, and or the like. At operation 410, the transfer application 114 may receive from the user an indication of a fund transfer mechanism from the candidate fund transfer mechanisms that can be used to execute the requested fund transfer.

At optional operation 412, the transfer application 114 may determine if a risk score for the requested fund transfer with the fund transfer mechanism selected by the user is greater than a threshold value. If the risk score is greater than the threshold value, the transfer application 114 may execute an exception routine at operation 414. The exception routine may be arranged to mitigate risk associated with the requested fund transfer, for example, by soliciting additional approval before proceeding and/or declining to proceed with the requested fund transfer. Examples of exception routines with additional details are provided herein, for example, with respect to FIGS. 7-9.

If the risk score is not greater than the threshold value at operation 412 and/or after receiving the selected fund transfer mechanism at operation 410, the transfer application 114 may execute the requested fund transfer using the selected fund transfer mechanism at operation 416. For example, the layer 118, 120, 122, 124, 126 of the transfer application 114 corresponding to the selected fund transfer mechanism may initiate the fund transfer by communicating with the appropriate fund transfer mechanism system 136, 138, 140, 142.

Figure 5:
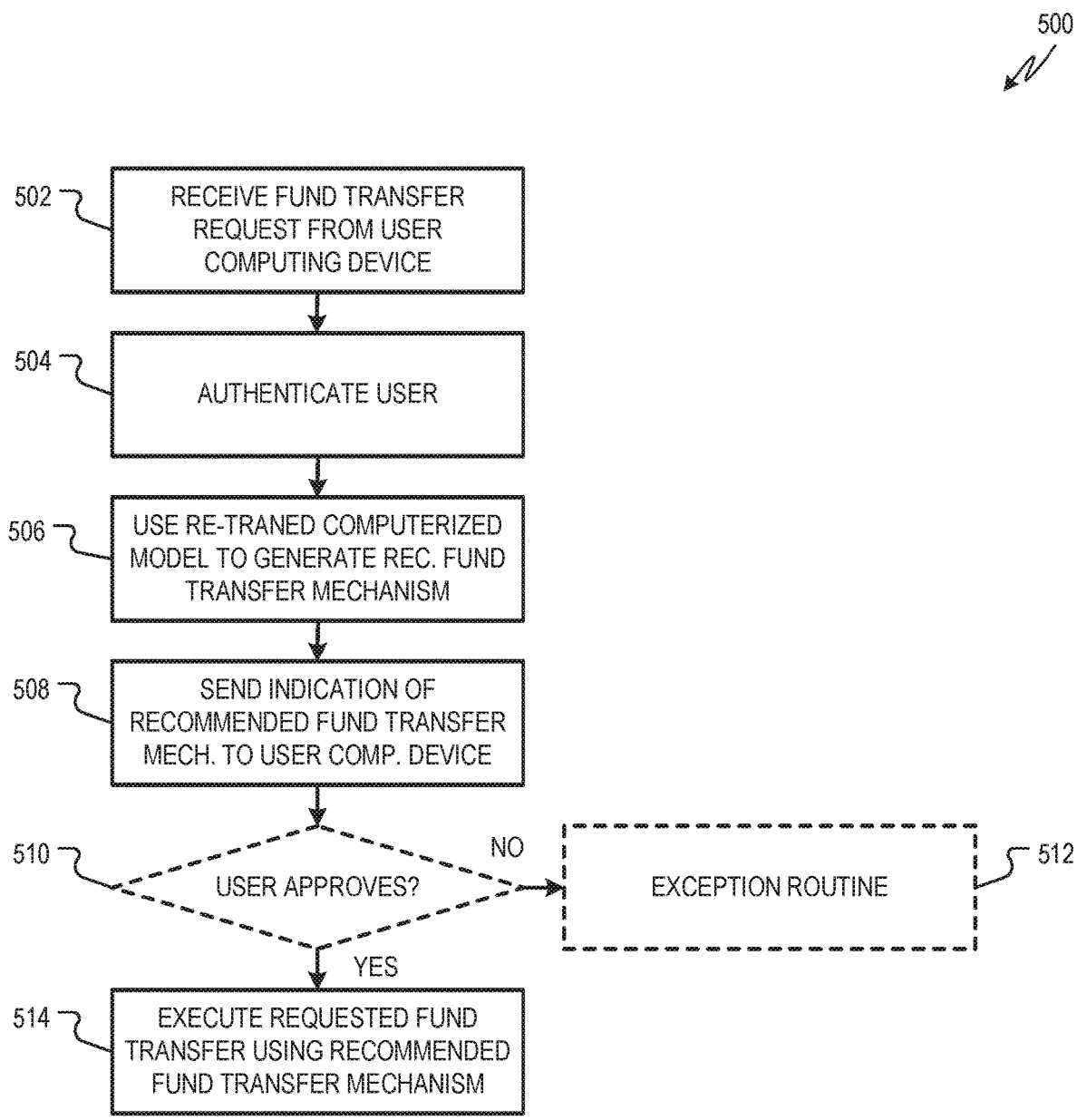
FIG. 5 is a flowchart showing one example of a process flow that may be executed in the environment of FIG. 1 using the re-trained computerized model.

FIG. 5 is a flowchart showing one example of a process flow 500 that may be executed by the transfer application 114 to execute a fund transfer request, such as the received fund transfer request, using the re-trained computerized model 129. At operation 502, the transfer application 114 receives fund transfer request from the user via a user computing. With respect to the received fund transfer request, the user may be a sending user or a receiving user. The received fund transfer request may include values for a set of fund transfer parameters describing the requested fund transfer. At operation 504, the transfer application 114 authenticates the user, for example, as described herein with respect to FIG. 4.

At operation 506, the transfer application 114 uses the re-trained computerized model 129 to generate a set of candidate fund transfer mechanisms for the requested fund transfer, including a recommended fund transfer mechanism. The recommended fund transfer mechanism may be, for example, the fund transfer mechanism having the highest likelihood of success, the lowest risk score, or some combination the two.

At operation 508, the transfer application 114 may send to the user (e.g., via the user computing device 108A, 108B), an indication of the candidate fund transfer mechanisms determined at operation 506 along with an indication of the recommended fund transfer mechanism. This may include, for example, providing the user with descriptions of the candidate fund transfer mechanisms such as, for example, times to complete the transfers, costs to the sending user, costs to the receiving user, available insurance options, and or the like. At operation 508, the transfer application 114 may receive from the user an indication of a fund transfer mechanism from the candidate fund transfer mechanisms that can be used to execute the requested fund transfer.

At optional operation 510, the transfer application 114 may determine whether the user has selected the recommended fund transfer mechanism for the fund transfer. If the user has not selected the recommended fund transfer mechanism (e.g., if the user has selected one of the other candidate fund transfer mechanisms or a different fund transfer mechanism), then the transfer application 114 may execute an exception routine at operation 512.

If the risk score is not greater than the threshold value at operation 510 and/or after receiving the selected fund transfer mechanism at operation 508, the transfer application 114 may execute the requested fund transfer using the selected fund transfer mechanism at operation 514.

Figure 6:
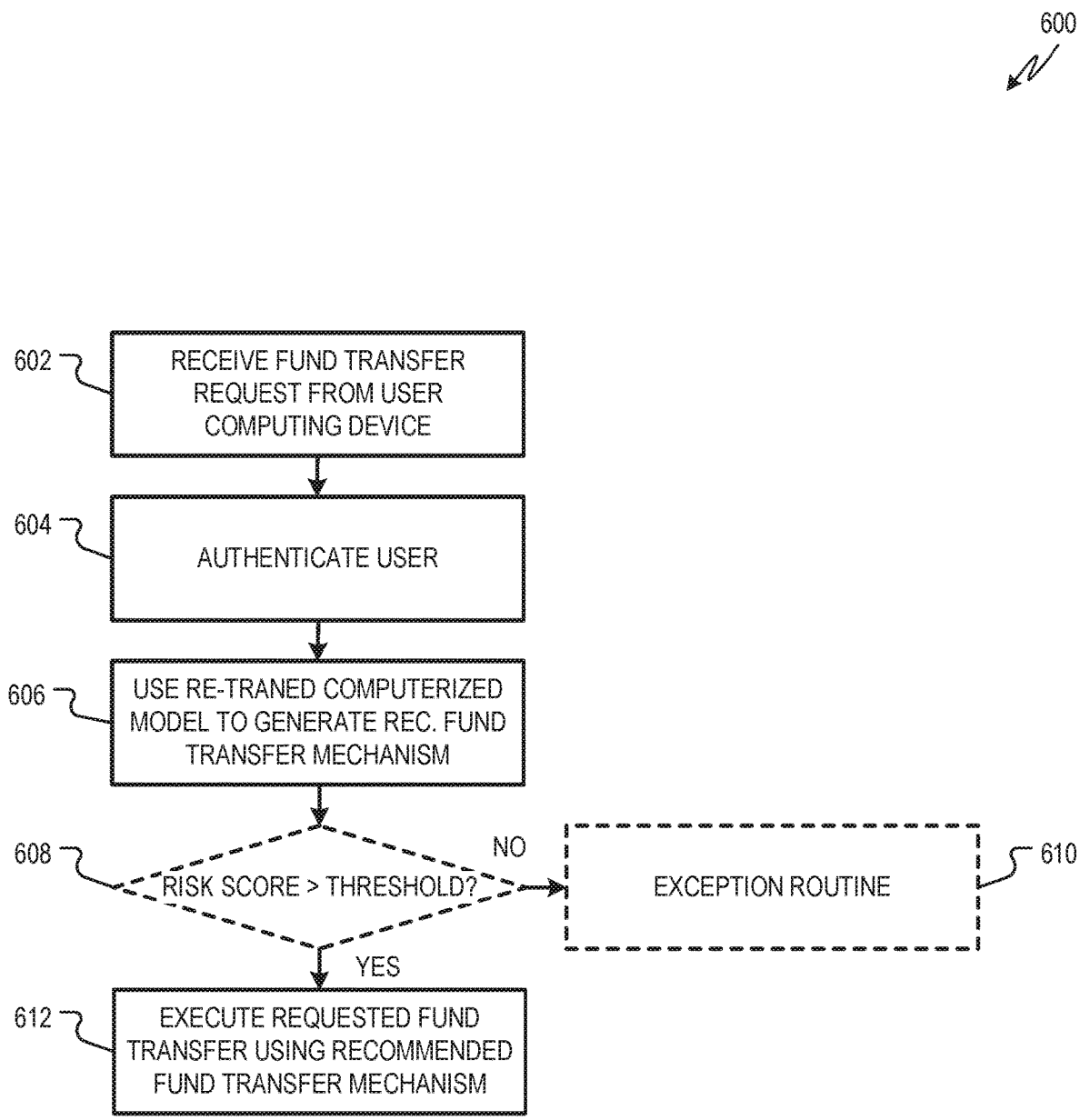
FIG. 6 is a flowchart showing another example of a process flow that may be executed in the environment of FIG. 1 using the re-trained computerized model.

FIG. 6 is a flowchart showing another example of a process flow 600 that may be executed by the transfer application 114 to execute a fund transfer request, such as the received fund transfer request, using the re-trained computerized model 129. At operation 602, the transfer application 114 receives fund transfer request from the user via a user computing. With respect to the received fund transfer request, the user may be a sending user or a receiving user. The received fund transfer request may include values for a set of fund transfer parameters describing the requested fund transfer. At operation 604, the transfer application 114 authenticates the user, for example, as described herein with respect to FIG. 4.

At operation 606, the transfer application 114 uses the re-trained computerized model 129 to generate a recommended fund transfer mechanism for the requested fund transfer. The recommended fund transfer mechanism may be, for example, the fund transfer mechanism having the highest likelihood of success, the lowest risk score, or some combination the two.

At operation 608, the transfer application 114 may determine if a risk score for the requested fund transfer with the recommended fund transfer mechanism is greater than a threshold value. If the risk score is greater than the threshold value, the transfer application 114 may execute an exception routine at operation 610. If the risk score is not greater than the threshold value at operation 608 and/or after determining the recommended fund transfer mechanism at operation 606, the transfer application 114 may execute the requested fund transfer using the selected fund transfer mechanism at operation 612.

Figure 7:
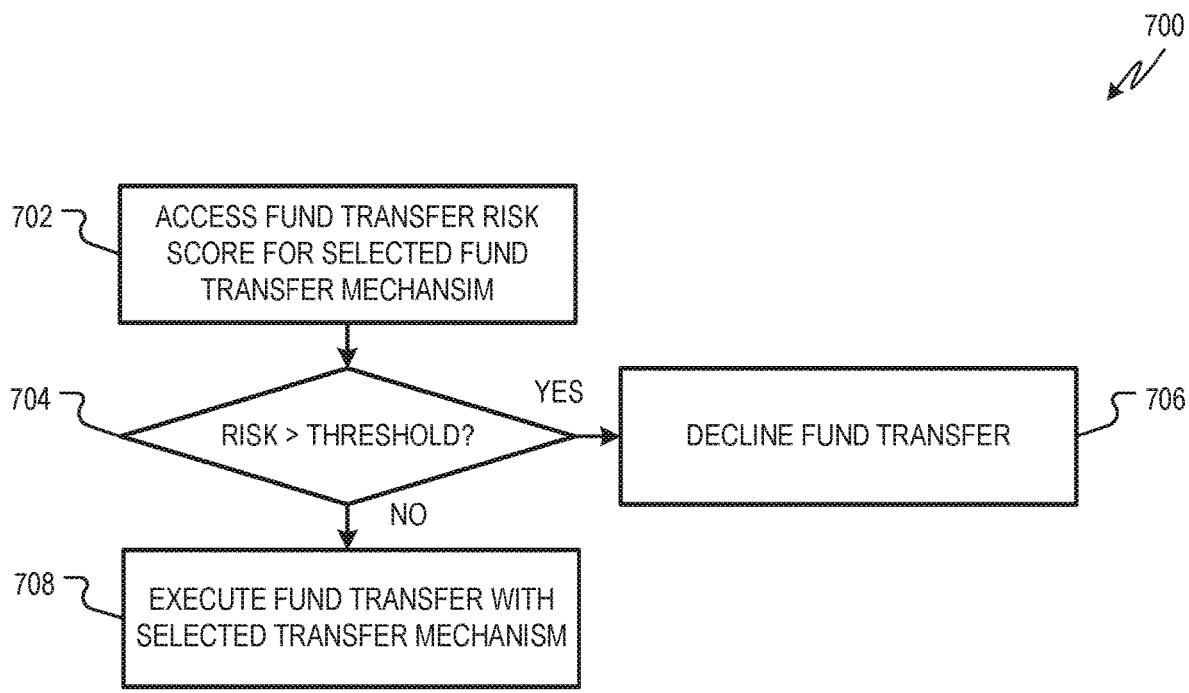
FIG. 7 is a flowchart showing one example of a process flow describing an example exception routine that may be executed in the environment of FIG. 1.

FIG. 7 is a flowchart showing one example of a process flow 700 describing an example exception routine that may be executed by the transfer application 114. At operation 702, the transfer application 114 may access a fund transfer risk score for the requested fund transfer. If, at operation 704, the risk score is greater than a threshold level, the transfer application 114 may decline the fund transfer at operation 706. If the risk score is not greater than the threshold level, the transfer application 114 may execute the transaction with the selected and/or recommended fund transfer mechanism at operation 708.

Figure 8:
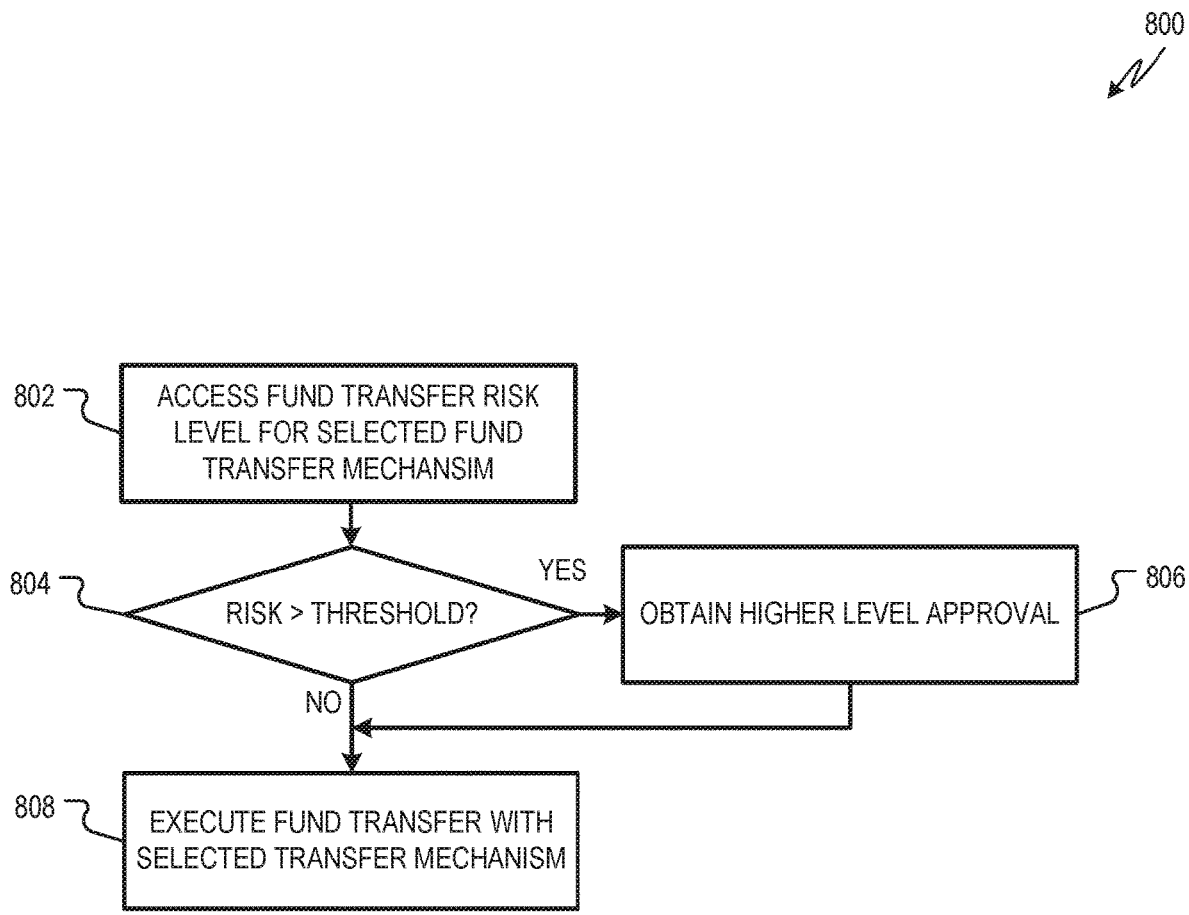
FIG. 8 is a flowchart showing one example of a process flow describing another example exception routine that may be executed in the environment of FIG. 1.

FIG. 8 is a flowchart showing one example of a process flow 800 describing another example exception routine that may be executed by the transfer application 114. At operation 802, the transfer application 114 may access a fund transfer risk score for the requested fund transfer. If, at operation 804, the risk score is greater than a threshold level, the transfer application 114 may obtain a higher-level approval for the requested fund transfer. This may include, for example, querying a supervisory user associated with the same organization as the requesting user, via a user computing device, and requesting that the supervisory user approve the requested fund transfer. Obtaining higher approval, in some examples, may include querying a user within the financial institution handling the fund transfer to request approval of the requested fund transfer. In some examples, the supervisory user or other queried user may decline to provide higher level approval, in which the requested fund transfer may be declined. If the risk score is not greater than the threshold at operation 804 and/or after higher-level approval is obtained at operation 806, the transfer application 114 may execute the requested fund transfer at operation 808.

Figure 9:
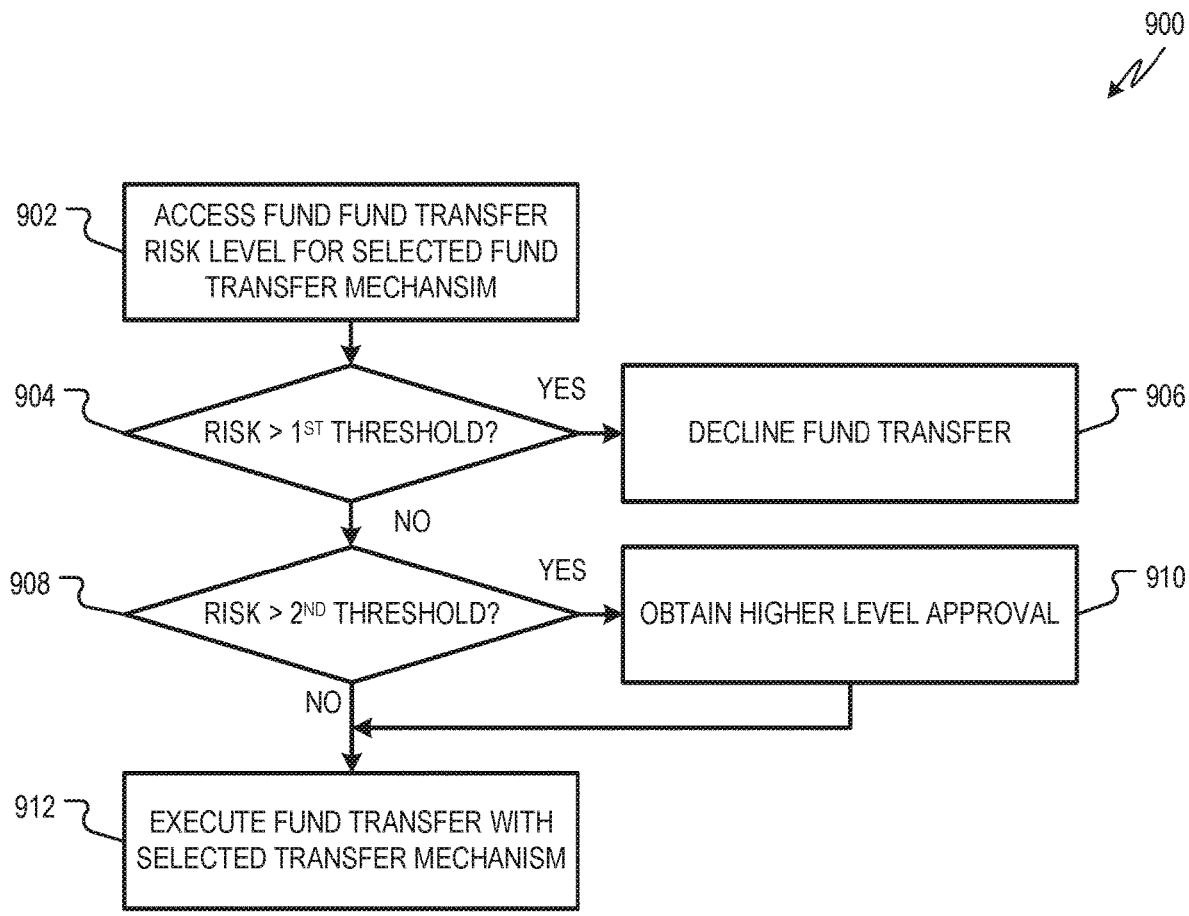
FIG. 9 is a flowchart showing one example of a process flow describing another example exception routine that may be executed in the environment of FIG. 1.

FIG. 9 is a flowchart showing one example of a process flow 900 describing another example exception routine that may be executed by the transfer application 114. At operation 902, the transfer application 114 may access a fund transfer risk score for the requested fund transfer.

At operation 904, the transfer application 114 may determine whether the risk score is greater than a first threshold. If the risk score is greater than the first threshold, the transfer application 114 may decline the requested fund transfer at operation 906.

If the risk score is not greater than the first threshold, the transfer application 114 may determine, at operation 908, whether the risk score is greater than a second threshold. For example, the second threshold may indicate a lower level of risk than the first threshold. If, at operation 908, the risk score is greater than the second threshold, the transfer application 114 may obtain a higher-level approval for the requested fund transfer, as described herein at operation 910. If the risk score is not greater than the second threshold at operation 908 and/or after higher-level approval is obtained at operation 910, the transfer application 114 may execute the requested fund transfer at operation 912.

Figure 10:
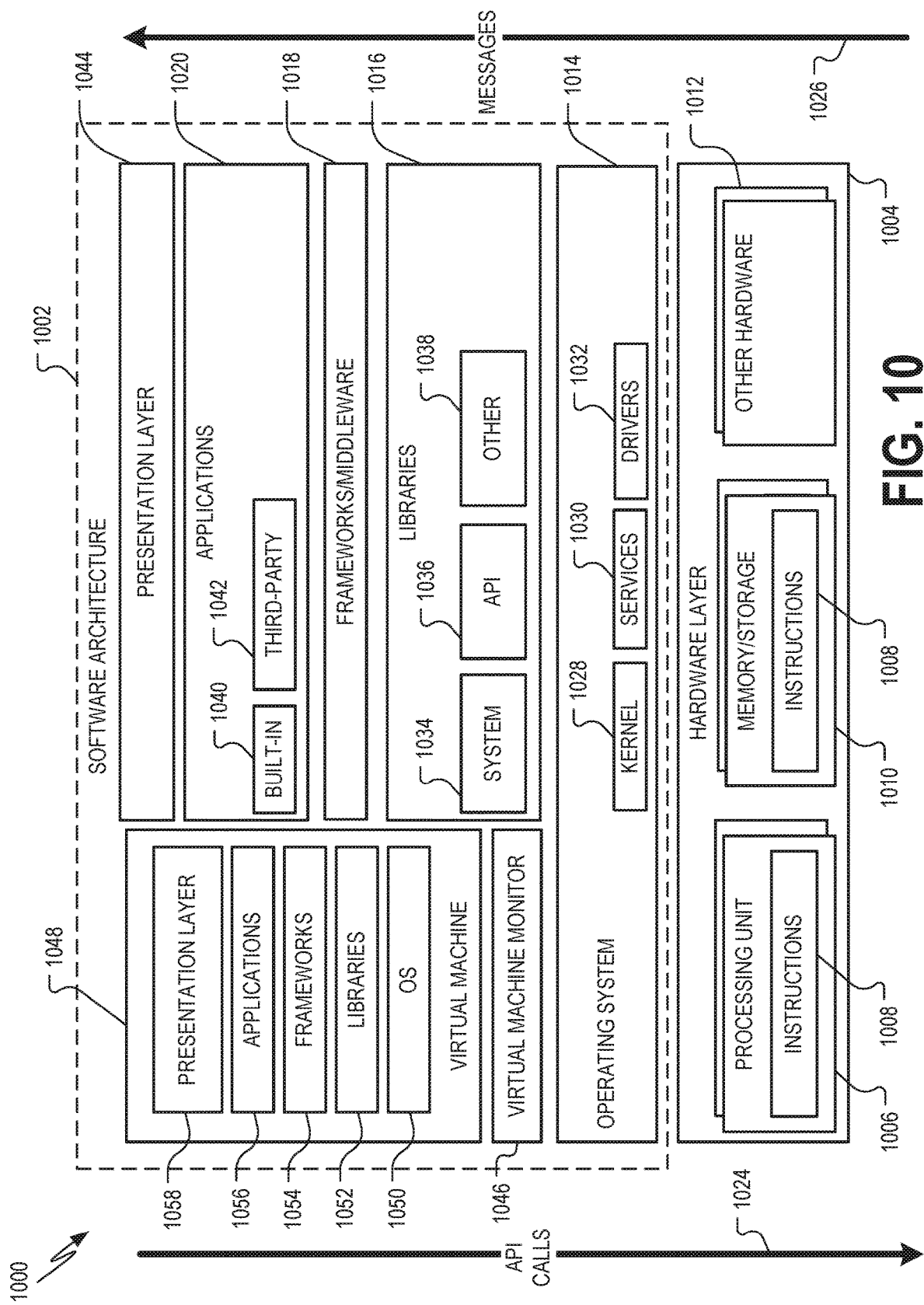
FIG. 10 is a block diagram showing one example of a software architecture for a computing device.

FIG. 10 is a block diagram 1000 showing one example of a software architecture 1002 for a computing device. The software architecture 1002 may be used in conjunction with various hardware architectures, for example, as described herein. FIG. 10 is merely a non-limiting example of a software architecture 1002, and many other architectures may be implemented to facilitate the functionality described herein. A representative hardware layer 1004 is illustrated and can represent, for example, any of the above-referenced computing devices. In some examples, the hardware layer 1004 may be implemented according to an architecture 1100 of FIG. 11.

The representative hardware layer 1004 comprises one or more processing units 1006 having associated executable instructions 1008. The executable instructions 1008 represent the executable instructions of the software architecture 1002, including implementation of the methods, modules, components, and so forth of FIGS. 1-13. The hardware layer 1004 also includes memory and/or storage modules 1010, which also have the executable instructions 1008. The hardware layer 1004 may also comprise other hardware 1012, which represents any other hardware of the hardware layer 1004, such as the other hardware illustrated as part of the architecture 1100.

In the example architecture of FIG. 10, the software architecture 1002 may be conceptualized as a stack of layers where each layer provides particular functionality. For example, the software architecture 1002 may include layers such as an operating system 1014, libraries 1016, middleware layer 1018, applications 1020, and a presentation layer 1044. Operationally, the applications 1020 and/or other components within the layers may invoke application programming interface (API) calls 1024 through the software stack and receive a response, returned values, and so forth illustrated as messages 1026 in response to the API calls 1024. The layers illustrated are representative in nature and not all software architectures have all layers. For example, some mobile or special-purpose operating systems may not provide a middleware layer 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of a hardware or software interrupt and, in response, cause the software architecture 1002 to pause its current processing and execute an interrupt service routine (ISR) when an interrupt is received. The ISR may generate an alert.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than by interfacing directly with the underlying operating system 1014 functionality (e.g., kernel 1028, services 1030, and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The middleware layer 1018 (also sometimes referred to as frameworks) may provide a higher-level common infrastructure that may be utilized by the applications 1020 and/or other software components/modules. For example, the middleware layer 1018 may provide various graphical UI functions, high-level resource management, high-level location services, and so forth. The middleware layer 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. The third-party applications 1042 may include any of the built-in applications 1040 as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1042 may invoke the API calls 1024 provided by the mobile operating system such as the operating system 1014 to facilitate functionality described herein.

The applications 1020 may utilize built-in operating system functions (e.g., kernel 1028, services 1030, and/or drivers 1032), libraries (e.g., system libraries 1034, API libraries 1036, and other libraries 1038), or middleware layer 1018 to create UIs to interact with users of the system. Alternatively, or additionally, in some systems, interactions with a user may occur through a presentation layer, such as the presentation layer 1044. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 10, this is illustrated by a virtual machine 1048. A virtual machine creates a software environment where applications/modules can execute as if they were executing on a hardware computing device. The virtual machine 1048 is hosted by a host operating system (e.g., the operating system 1014) and typically, although not always, has a virtual machine monitor 1046, which manages the operation of the virtual machine 1048 as well as the interface with the host operating system (e.g., the operating system 1014). A software architecture executes within the virtual machine 1048, such as an operating system 1050, libraries 1052, frameworks/middleware 1054, applications 1056, and/or a presentation layer 1058. These layers of software architecture executing within the virtual machine 1048 can be the same as corresponding layers previously described or may be different.

Figure 11:
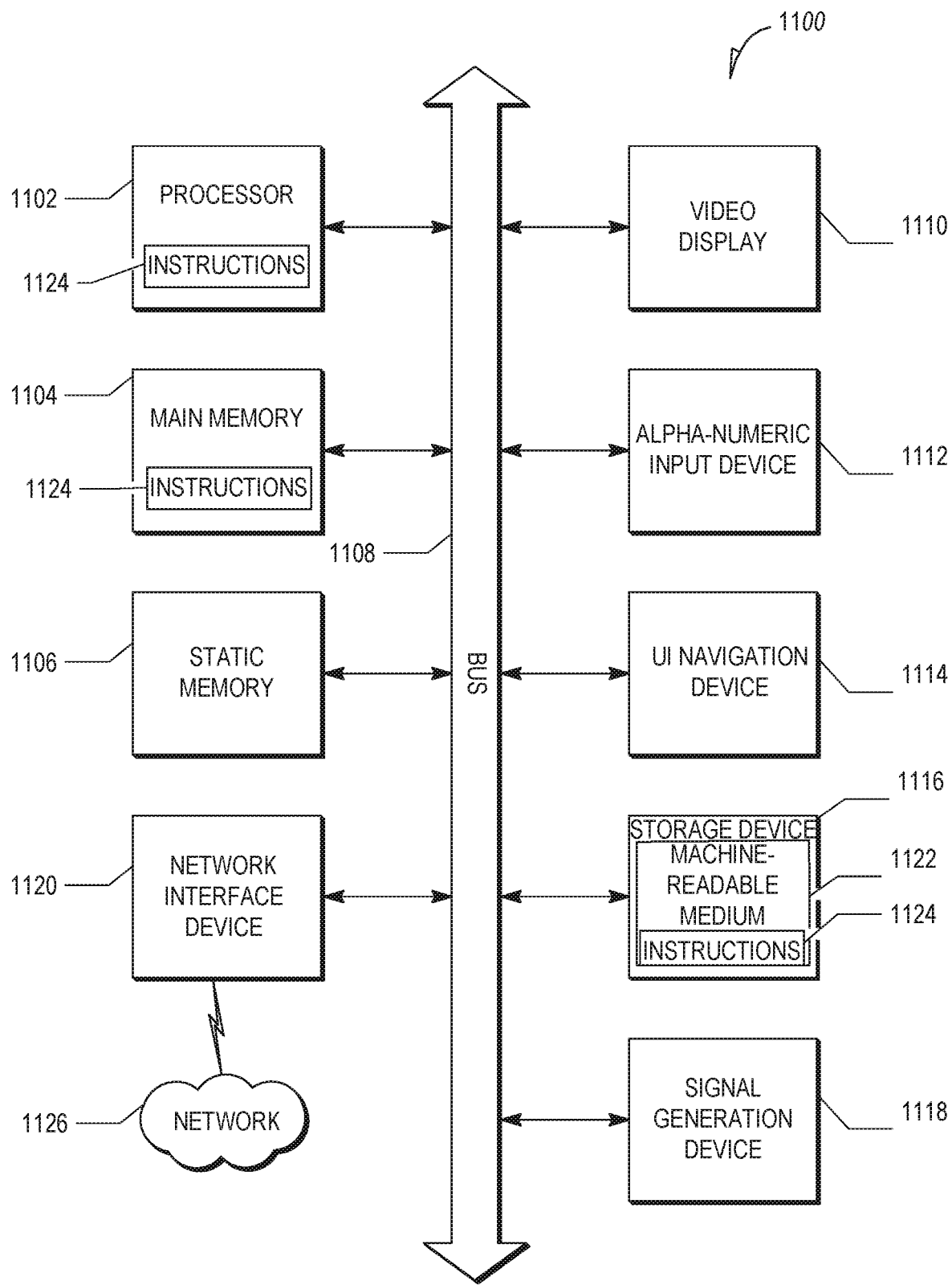
FIG. 11 is a block diagram illustrating a computing device hardware architecture, within which a set or sequence of instructions can be executed to cause a machine to perform examples of any one of the methodologies discussed herein.

FIG. 11 is a block diagram illustrating a computing device hardware architecture 1100, within which a set or sequence of instructions can be executed to cause a machine to perform examples of any one of the methodologies discussed herein. The architecture 1100 may describe, for example, any of the computing devices and/or control circuits described herein. The architecture 1100 may execute the software architecture 1002 described with respect to FIG. 10. The architecture 1100 may operate as a standalone device or may be connected (e.g., networked) to other machines. In a networked deployment, the architecture 1100 may operate in the capacity of either a server or a client machine in server-client network environments, or it may act as a peer machine in peer-to-peer (or distributed) network environments. The architecture 1100 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1100 includes a processor unit 1102 comprising at least one processor (e.g., a central processing unit (CPU), a graphics processing unit (GPU), or both, processor cores, compute nodes, etc.). The architecture 1100 may further comprise a main memory 1104 and a static memory 1106, which communicate with each other via a link 1108 (e.g., a bus). The architecture 1100 can further include a video display unit 1110, an alphanumeric input device 1112 (e.g., a keyboard), and a UI navigation device 1114 (e.g., a mouse). In some examples, the video display unit 1110, alphanumeric input device 1112, and UI navigation device 1114 are incorporated into a touchscreen display. The architecture 1100 may additionally include a storage device 1116 (e.g., a drive unit), a signal generation device 1118 (e.g., a speaker), a network interface device 1120, and one or more sensors (not shown), such as a GPS sensor, compass, accelerometer, or other sensor.

In some examples, the processor unit 1102 or another suitable hardware component may support a hardware interrupt. In response to a hardware interrupt, the processor unit 1102 may pause its processing and execute an ISR, for example, as described herein.

The storage device 1116 includes a machine-readable medium 1122 on which is stored one or more sets of data structures and instructions 1124 (e.g., software) embodying or utilized by any one or more of the methodologies or functions described herein. The instructions 1124 can also reside, completely or at least partially, within the main memory 1104, within the static memory 1106, and/or within the processor unit 1102 during execution thereof by the architecture 1100, with the main memory 1104, the static memory 1106, and the processor unit 1102 also constituting machine-readable media. The instructions 1124 stored at the machine-readable medium 1122 may include, for example, instructions for implementing the software architecture 1002, instructions for executing any of the features described herein, etc.

While the machine-readable medium 1122 is illustrated in an example to be a single medium, the term "machine-readable medium" can include a single medium or multiple media (e.g., a centralized or distributed database, and/or associated caches and servers) that store the one or more instructions 1124. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM) and electrically erasable programmable read-only memory (EEPROM)) and flash memory devices; magnetic disks such as internal hard disks and removable disks; magneto-optical disks; and CD-ROM and DVD-ROM disks.

The instructions 1124 can further be transmitted or received over a communications network 1126 using a transmission medium via the network interface device 1120 utilizing any one of a number of well-known transfer protocols (e.g., hypertext transfer protocol (HTTP)). Examples of communication networks include a LAN, a WAN, the Internet, mobile telephone networks, plain old telephone service (POTS) networks, and wireless data networks (e.g., Wi-Fi, 7G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 77 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A system for facilitating fund transfers, the system comprising at least one processor programmed to perform operations comprising:
    accessing first training data comprising a first plurality of fund transfer records, a first fund transfer record of the first plurality of fund transfer records comprising:
        an indication of a first completed fund transfer from a first source financial account to a first target financial account;
        an indication of a first transfer mechanism used for the first completed fund transfer; and
        first feedback data describing customer feedback on the first completed fund transfer;
    generating first label data for the first fund transfer record, the first label data being based at least in part on the indication of the first transfer mechanism and the first feedback data;
    training a computerized model, using the first training data, to generate a trained computerized model, the trained computerized model to determine at least one recommended fund transfer mechanism based on a set of fund transfer parameter values;
    servicing a plurality of fund transfer requests using the trained computerized model;
    accessing second training data comprising a second plurality of fund transfer records describing fund transfers executed in response to the plurality of fund transfer requests, the second plurality of fund transfer records and the first plurality of fund transfer records not including any fund transfer records in common;
    re-training the computerized model using the second training data to generate a re-trained computerized model; and
    servicing an additional plurality of fund transfer requests using the re-trained computerized model.

2. The system of claim 1, the servicing of the plurality of fund transfer requests comprising:
    receiving, from a first user computing device, a first fund transfer request of the plurality of fund transfer requests from a first user computing device, the first fund transfer request describing a first requested fund transfer;
    authenticating a first user associated with the first user computing device;
    accessing first counterparty data describing a counterparty for the first requested fund transfer;
    using the trained computerized model to select a plurality of candidate fund transfer mechanisms for the first requested fund transfer;
    sending, to the first user computing device, an indication of the plurality of candidate fund transfer mechanisms for the first requested fund transfer;
    receiving, from the first user computing device a selected fund transfer mechanism from the plurality of candidate fund transfer mechanisms for the first requested fund transfer; and
    executing the first requested fund transfer using the selected fund transfer mechanism.

3. The system of claim 2, the second plurality of fund transfer records comprising a fund transfer record describing the first requested fund transfer, the fund transfer record describing the first requested fund transfer comprising:
    an indication of the plurality of candidate fund transfer mechanisms for the first requested fund transfer; and
    an indication of the selected fund transfer mechanism.

4. The system of claim 1, the servicing of the additional plurality of fund transfer requests comprising:
    receiving a first fund transfer request of the additional plurality of fund transfer requests from a second user computing device;
    using the re-trained computerized model to select a recommended fund transfer mechanism for the first fund transfer request; and
    executing the first fund transfer request using the recommended fund transfer mechanism.

5. The system of claim 1, the servicing of the additional plurality of fund transfer requests comprising:
    receiving a second fund transfer request of the additional plurality of fund transfer requests from a second user computing device, the second fund transfer request describing a second requested fund transfer;
    using the re-trained computerized model to select a recommended fund transfer mechanism for the second requested fund transfer;

receiving, from the second user computing device, an indication that a user has selected a fund transfer mechanism different than the recommended fund transfer mechanism; and executing an exception routine associated with the second fund transfer request.

6. The system of claim 5, the executing of the exception routine comprising declining to execute the second requested fund transfer.

7. The system of claim 5, the executing of the exception routine comprising:
sending an approval request to a third user computing device associated with a supervisory user, the approval request indicating a fund transfer mechanism for the second requested fund transfer;
receiving approval data from the third user computing device, the approval data indicating that the second requested fund transfer is approved; and
executing the second requested fund transfer using the recommended fund transfer mechanism.

8. The system of claim 1, the servicing of the additional plurality of fund transfer requests comprising:
receiving a third fund transfer request of the additional plurality of fund transfer requests from a third user computing device, the third fund transfer request describing a third requested fund transfer;
using the re-trained computerized model to select a recommended fund transfer mechanism for the third fund transfer request and a risk score describing a risk of executing the third requested fund transfer using the recommended fund transfer mechanism;
determining that the risk score is greater than a threshold value; and
executing an exception routine associated with the third fund transfer request.

9. A method comprising:
accessing, by a fund transfer system, first training data comprising a first plurality of fund transfer records, the fund transfer system comprising at least one processor and a memory in communication with the at least one processor, and a first fund transfer record of the first plurality of fund transfer records comprising:
an indication of a first completed fund transfer from a first source financial account to a first target financial account;
an indication of a first transfer mechanism used for the first completed fund transfer; and
first feedback data describing customer feedback on the first completed fund transfer;
generating first label data for the first fund transfer record, the first label data being based at least in part on the indication of the first transfer mechanism and the first feedback data;
training a computerized model, using the first training data, to generate a trained computerized model, the trained computerized model to determine at least one recommended fund transfer mechanism based on a set of fund transfer parameter values;
servicing, by the fund transfer system, a plurality of fund transfer requests using the trained computerized model;
accessing, by the fund transfer system, second training data comprising a second plurality of fund transfer records describing fund transfers executed in response to the plurality of fund transfer requests, the second plurality of fund transfer records and the first plurality of fund transfer records not including any fund transfer records in common;

re-training the computerized model using the second training data to generate a re-trained computerized model; and
servicing an additional plurality of fund transfer requests using the re-trained computerized model.

10. The method of claim 9, the servicing of the plurality of fund transfer requests comprising:
receiving, from a first user computing device, a first fund transfer request of the plurality of fund transfer requests from a first user computing device, the first fund transfer request describing a first requested fund transfer;
authenticating a first user associated with the first user computing device;
accessing first counterparty data describing a counterparty for the first requested fund transfer;
using the trained computerized model to select a plurality of candidate fund transfer mechanisms for the first requested fund transfer;
sending, to the first user computing device, an indication of the plurality of candidate fund transfer mechanisms for the first requested fund transfer;
receiving, from the first user computing device a selected fund transfer mechanism from the plurality of candidate fund transfer mechanisms for the first requested fund transfer; and
executing the first requested fund transfer using the selected fund transfer mechanism.

11. The method of claim 10, the second plurality of fund transfer records comprising a fund transfer record describing the first requested fund transfer, the fund transfer record describing the first requested fund transfer comprising:
an indication of the plurality of candidate fund transfer mechanisms for the first requested fund transfer; and
an indication of the selected fund transfer mechanism.

12. The method of claim 9, the servicing of the additional plurality of fund transfer requests comprising:
receiving a first fund transfer request of the additional plurality of fund transfer requests from a second user computing device;
using the re-trained computerized model to select a recommended fund transfer mechanism for the first fund transfer request; and
executing the first fund transfer request using the recommended fund transfer mechanism.

13. The method of claim 9, the servicing of the additional plurality of fund transfer requests comprising:
receiving a second fund transfer request of the additional plurality of fund transfer requests from a second user computing device, the second fund transfer request describing a second requested fund transfer;
using the re-trained computerized model to select a recommended fund transfer mechanism for the second requested fund transfer;
receiving, from the second user computing device, an indication that a user has selected a fund transfer mechanism different than the recommended fund transfer mechanism; and
executing an exception routine associated with the second fund transfer request.

14. The method of claim 13, the executing of the exception routine comprising declining to execute the second requested fund transfer.

15. The method of claim 13, the executing of the exception routine comprising:
sending an approval request to a third user computing device associated with a supervisory user, the approval request indicating a fund transfer mechanism for the second requested fund transfer;

receiving approval data from the third user computing device, the approval data indicating that the second requested fund transfer is approved; and executing the second requested fund transfer using the recommended fund transfer mechanism.

16. The method of claim 9, the servicing of the additional plurality of fund transfer requests comprising:

receiving a third fund transfer request of the additional plurality of fund transfer requests from a third user computing device, the third fund transfer request describing a third requested fund transfer;

using the re-trained computerized model to select a recommended fund transfer mechanism for the third fund transfer request and a risk score describing a risk of executing the third requested fund transfer using the recommended fund transfer mechanism;

determining that the risk score is greater than a threshold value; and executing an exception routine associated with the third fund transfer request.

17. A non-transitory machine-readable medium comprising instructions thereon that, when executed by at least one processor, causes the at least one processor to perform operations comprising:

accessing first training data comprising a first plurality of fund transfer records, a first fund transfer record of the first plurality of fund transfer records comprising:

an indication of a first completed fund transfer from a first source financial account to a first target financial account;

an indication of a first transfer mechanism used for the first completed fund transfer; and first feedback data describing customer feedback on the first completed fund transfer;

generating first label data for the first fund transfer record, the first label data being based at least in part on the indication of the first transfer mechanism and the first feedback data;

training a computerized model, using the first training data, to generate a trained computerized model, the trained computerized model to determine at least one recommended fund transfer mechanism based on a set of fund transfer parameter values;

servicing a plurality of fund transfer requests using the trained computerized model;

accessing second training data comprising a second plurality of fund transfer records describing fund transfers executed in response to the plurality of fund transfer requests, the second plurality of fund transfer records and the first plurality of fund transfer records not including any fund transfer records in common;

re-training the computerized model using the second training data to generate a re-trained computerized model; and servicing an additional plurality of fund transfer requests using the re-trained computerized model.

18. The medium of claim 17, the servicing of the plurality of fund transfer requests comprising:

receiving, from a first user computing device, a first fund transfer request of the plurality of fund transfer requests from a first user computing device, the first fund transfer request describing a first requested fund transfer;

authenticating a first user associated with the first user computing device;

accessing first counterparty data describing a counterparty for the first requested fund transfer;

using the trained computerized model to select a plurality of candidate fund transfer mechanisms for the first requested fund transfer;

sending, to the first user computing device, an indication of the plurality of candidate fund transfer mechanisms for the first requested fund transfer;

receiving, from the first user computing device a selected fund transfer mechanism from the plurality of candidate fund transfer mechanisms for the first requested fund transfer; and executing the first requested fund transfer using the selected fund transfer mechanism.

19. The medium of claim 18, the second plurality of fund transfer records comprising a fund transfer record describing the first requested fund transfer, the fund transfer record describing the first requested fund transfer comprising:

an indication of the plurality of candidate fund transfer mechanisms for the first requested fund transfer; and an indication of the selected fund transfer mechanism.

20. The medium of claim 17, the servicing of the additional plurality of fund transfer requests comprising:

receiving a first fund transfer request of the additional plurality of fund transfer requests from a second user computing device;

using the re-trained computerized model to select a recommended fund transfer mechanism for the first fund transfer request; and executing the first fund transfer request using the recommended fund transfer mechanism.

* * * * *